(12) United States Patent
Longmore et al.

(10) Patent No.: US 12,009,990 B1
(45) Date of Patent: Jun. 11, 2024

(54) HARDWARE-BASED FAULT INJECTION SERVICE

(71) Applicant: Amazon Technologies, Inc., Seattle, WA (US)

(72) Inventors: Juan-Pierre Longmore, Bellevue, WA (US); Peng Gu, Vienna, VA (US); Noel O'Flaherty, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 36 days.

(21) Appl. No.: 17/710,156

(22) Filed: Mar. 31, 2022

(51) Int. Cl.
*H04L 41/14* (2022.01)
*H04L 9/40* (2022.01)
*H04L 12/12* (2006.01)

(52) U.S. Cl.
CPC ............ *H04L 41/145* (2013.01); *H04L 12/12* (2013.01); *H04L 63/101* (2013.01)

(58) Field of Classification Search
CPC .... H04L 12/12; H04L 41/0631; H04L 41/145
USPC ......................................................... 709/224
See application file for complete search history.

(56) References Cited

U.S. PATENT DOCUMENTS

| | | | | |
|---|---|---|---|---|
| 6,477,666 | B1 * | 11/2002 | Sanchez ............... | G06F 11/3688 714/38.12 |
| 10,353,729 | B1 * | 7/2019 | Bell .......................... | G06F 8/20 |
| 11,119,800 | B1 * | 9/2021 | Kowalski ............. | G06F 11/3409 |
| 11,474,857 | B1 * | 10/2022 | Biemueller ......... | G06F 9/45558 |
| 2007/0294560 | A1 * | 12/2007 | Muthukumarasamy ..................... G06F 11/2635 714/2 |
| 2008/0025227 | A1 * | 1/2008 | Puttu .................. | H04L 41/0631 370/254 |
| 2012/0281698 | A1 * | 11/2012 | Forster ................ | H04L 41/0895 370/409 |
| 2013/0086583 | A1 * | 4/2013 | Uemura ................ | G06F 9/4401 718/1 |
| 2014/0040886 | A1 * | 2/2014 | Coles ...................... | G06F 21/53 718/1 |

(Continued)

FOREIGN PATENT DOCUMENTS

WO     WO-2013094048 A1 *   6/2013   .......... G06F 11/2007

OTHER PUBLICATIONS

English translation of WO-2013094049-A1, Clarivate Analytics, pp. 1-21 (2013) (Year: 2013).*

(Continued)

*Primary Examiner* — David P Zarka
(74) *Attorney, Agent, or Firm* — Thomas Horstemeyer, LLP

(57) ABSTRACT

Disclosed are various embodiments for simulating hardware-based faults in a cloud provider network. A first computing device can send a command to an offload card installed on a second computing device to introduce a simulated hardware fault into the second computing device. Then the first computing device can determine whether the second computing device has successfully recovered from the simulated hardware fault. Alternatively, an entry in an access control list (ACL) of a network switch can be modified to block network traffic to a first network interface of a host machine that is connected to the network switch. Then, a command can be sent to a second network interface of the host machine to instruct the host machine to perform a hard reset. Then it can be determined whether the host machine has successfully booted subsequent to the hard reset.

12 Claims, 3 Drawing Sheets

(56) References Cited

U.S. PATENT DOCUMENTS

2018/0067800 A1* 3/2018 Gusev ................... G06F 3/0647
2020/0409611 A1* 12/2020 Olson ................... G06F 3/0617
2022/0255817 A1* 8/2022 Hong .................... H04L 41/046

OTHER PUBLICATIONS

Merriam-Webster's Collegiate Dictionary 1230 (prep. def. 2a) (10th ed. 1993) (Year: 1993).*

* cited by examiner

HARDWARE-BASED FAULT INJECTION SERVICE

BACKGROUND

Chaos engineering is the process of introducing errors into a production environment in order to test the resiliency of the production environment in a real world environment. As many companies move their applications to the cloud, most of their infrastructure is implemented as virtualized instances of computation (e.g., virtual machines, virtual networking devices, virtual private clouds, etc.). Accordingly, companies may test the resiliency or performance of their applications and infrastructure by throttling resources available to virtual machines, blocking or throttling network traffic to or from one or more virtual machines, or destroying instances of virtual machines.

However, testing according to chaos engineering principles in a virtualized environment often has a number of limitations. For example, the cloud provider may limit the types of tests that can be performed on shared-tenant hosts, where virtual machines of multiple customers may be simultaneously hosted. As another example, chaos engineering tests in a virtualized environment is often limited to testing the impact of changes to the availability of virtualized computing resources, rather than changes in the availability of the underlying physical resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for simulating hardware-based faults in a network environment, such as a cloud computing environment. A test service can send instructions to a host machine to cause the host machine to disable hardware resources or to introduce intentional errors into the operation of hardware resources. Alternatively, the test service can communicate with network devices, such as switches, to modify or disable network access to a host machine to simulate a network failure. The test service can then monitor the host machine, either by directly communication with the host machine or using an out of band network connection to a management component or interface provided by the host machine, to monitor the behavior of the host machine. This can include determining whether host machine successfully recovers from the simulate hardware fault, as well as determining whether the services provided by the host machine (e.g., guest virtual machines) successfully recover and continue operation. The results of the test can be recorded and stored for future analysis.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
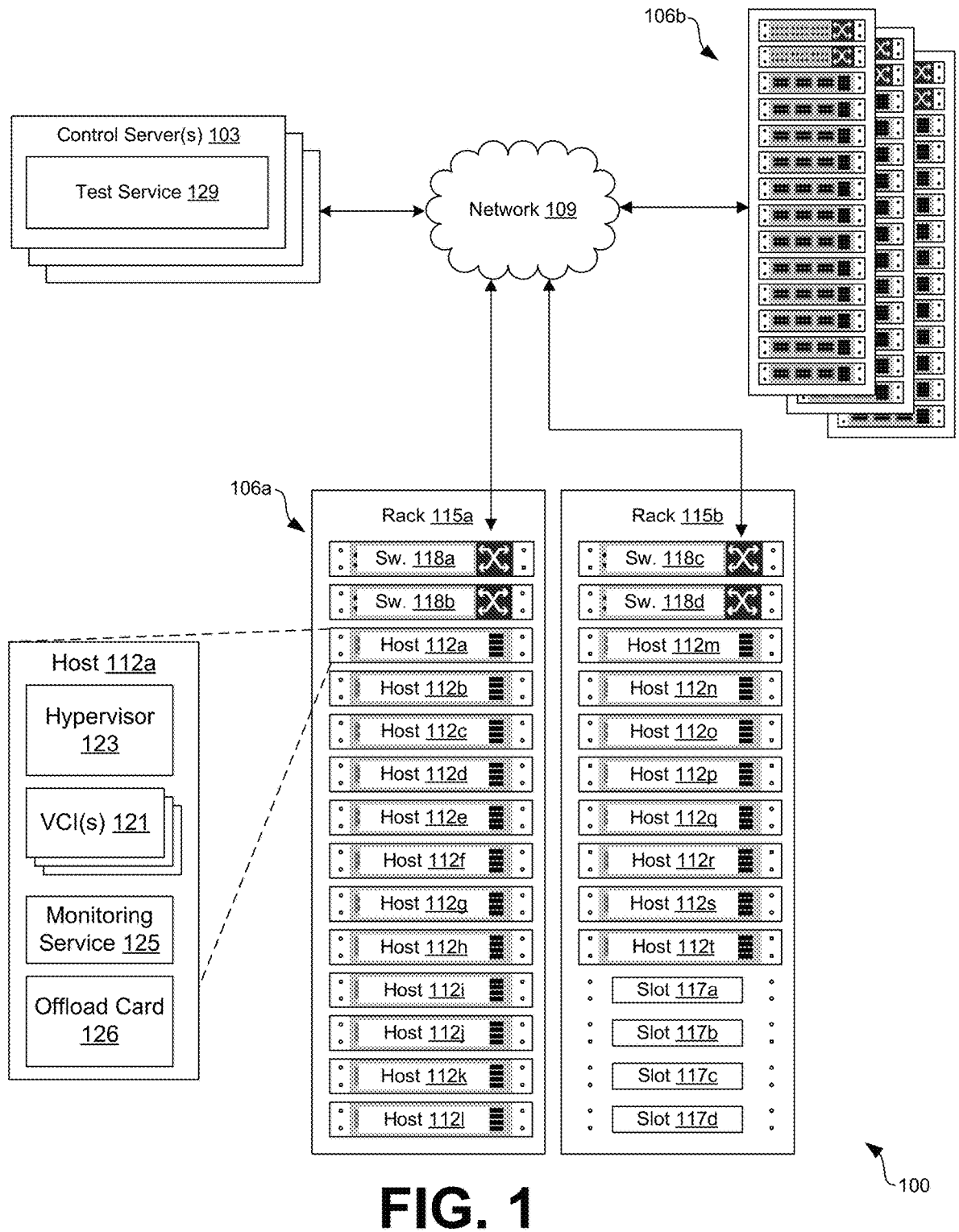
FIG. 1 is a drawing of a network environment according to various embodiments of the present disclosure.

FIG. 1 illustrates a cloud provider network 100 according to various embodiments of the present disclosure. The cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network 100, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network 100 to provide low-latency resource access to customers on a global scale with a high degree of fault tolerance and stability.

The cloud provider network 100 can be used to provide cloud computing services to end users. With cloud computing, instead of buying, owning, and maintaining their own data centers and servers, organizations can acquire technology such as compute power, storage, databases, and other services on an as-needed basis. The cloud provider network 100 can provide on-demand, scalable computing platforms to users through a network, thereby allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The traffic and operations of the cloud provider network 100 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers 103. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Accordingly, the cloud provider network 100 can include a number of components. For example, the cloud provider network 100 could include a control plane that includes one or more control servers 103. The cloud provider network 100 could also include one or more computing clusters 106, such as computing clusters 106a and 106b. These computing clusters 106 could be located in one or more data centers operated or controlled by the operator of the cloud provider network 100 or could be located on the premises of a customer of the cloud provider network 100.

All of these components can be in data communication with each other via a network 109. The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The control server 103 can represent one or more servers that implement or provide control plane operations over the logical control plane of the cloud provider network 100. To assist in the implementation of control plan operations, the control server 103 may implement various control services. These control services can provide an administrative interface for configuring the operation of individual components of the cloud provider network 100, such as configuring one or more host machines 112 to provide the resources requested by a user of the cloud provider network 100. As an example, the control services hosted by the control server 103 may provide a mechanism that allows users to allocate or modify the resources consumed by the user of the cloud provider network 100. This can include instantiating or modifying computing, networking, or storage resources provided by the cloud provider network 100. For instance, the control server 103 could implement user commands to create, modify, or terminate virtual machines hosted by cloud provider network 100, assign storage to virtual machines, create pools of shared storage, etc.

Each computing cluster 106 can include multiple host machines 112 or similar computing devices, such as host machines 112a-t. These host machines 112 can vary in the amount of memory, number of processors or processor cores, type of processor architecture, amount of disk storage, number and/or speed of network interfaces, and number or type of hardware accelerator cards (e.g., graphics processing units (GPUs), cryptographic coprocessors, etc.) installed. The differences in hardware installed in individual servers allows the cloud provider network 100 to offer computing services of different capabilities and/or at different price points. For example, Individual host machines 112 can be stored or arranged in one or more racks 115, such as racks 115a and 115b, which provide one or more slots 117. such as slots 117a-d, where individual host machines 112 can be placed. Accordingly, each rack 115 can allow for multiple host machines 112 to be colocated in close proximity to each other. This can facilitate management and allowing for low latency network or data connectivity between individual host machines 112 on the rack.

Each rack 115 can also include one or more switches 118, such as switches 118a-d, that provide network connectivity to the host machines 112 installed on the rack 115. These switches 118 can also provide network management functionality, such as allowing for control servers 103 to throttle network bandwidth allocated to individual host machines 112 or block traffic to or from individual host machines 112.

In some implementations, individual host machines 112 can be provisioned or allocated to users or customers with minimal software installed. In these situations, the customer receives a "bare metal" or a "dedicated" host machine 112 over which the customer has exclusive and nearly complete control. In these situations, the customer can install any operating system and/or applications that he or she prefers. Moreover, no other customers of the cloud provider network 100 may be allowed to share or use the dedicated host machine 112, which may be desirable in situations where a customer is concerned about potential security risks of a host machine 112 with multiple tenants, which may be referred to as "shared tenancy" or "shared tenant" hosts machines 112.

Both dedicated and shared tenancy host machines 112 can be configured to provide an operating environment for one or more virtual compute instances 121. Accordingly, a host machine 112 can have a hypervisor 123 installed to manage and coordinate the execution of any virtual compute instances 121 hosted by the host machine 112. The host machines 112 could be deployed, for example, as a part of an elastic cloud service (referred to in various implementations as an elastic compute service, a virtual machines service, a computing cloud service, a compute engine, or a cloud compute service).

A host machine 112 can also be configured to execute a monitoring service 125. The monitoring service 125 could be executed to collect performance metrics of the host machine 112, and monitor the health of services or applications executing on the host machine 112. For example, the monitoring service 125 could provide metrics related to CPU, memory, network, and disc utilization. The monitoring service 125 could also provide information regarding applications executing on the host machine 112, such as whether an application is currently executing or has ceased execution. This information could be retrieved by external applications, such as the test service 129, connecting to a predefined port (e.g., by making a hypertext transfer protocol (HTTP) connection to a predefined port used by the monitoring service 125. Moreover, individual virtual compute instances 121 could also be configured to execute their own instances of the monitoring service 125, thereby allowing external applications to retrieve diagnostic information from individual virtual compute instances 121 themselves.

In some instances, however, a host machine 112 could also represent a dedicated or special purpose piece of hardware. One example of such a host machine 112 is an atomic time server. Atomic time servers could be dedicated hosts that provide time keeping services. An atomic time server could rely on a cesium clock or other atomic clock, which could be installed in the atomic time server. The cesium clock or atomic clock could keep an accurate record of time, which the time atomic time server could use to respond to requests to synchronize the time of an internal clock of another computing device with the time maintained by the atomic clock of the atomic time server. However, other dedicated or special purpose hardware devices could also be represented by the host machines 112 depicted in FIG. 1. In these situations, hardware faults could be simulated for dedicated or special purpose hardware in order to monitor how other host machines 112 are impacted by their failure (e.g., to see how a host machine 112 responds when it cannot synchronize with an atomic time server).

The cloud provider network 100 may offer virtual compute instances 121 (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances 121 may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtual compute instances 121 may also be able to run in other environments, for example on the premises of customers, where such on-premise instances may be managed by the cloud provider or a third party. In some scenarios, the virtual compute instances 121 may be micro-virtual machines (microVMs). The cloud provider network 100 may offer other compute resources in addition to instances and microVMs, such as containers (which may run in instances or bare metal) and/or bare metal servers that are managed by a portion of a cloud provider service running on an offload card of the bare metal server.

The hypervisor 123, also known as a Virtual Machine Manager (VMM), allows multiple virtual compute instances 121 (e.g., virtual machines) to run on and share the same underling hardware. Each operating system created by and run/controlled by the hypervisor 123 is called a domain or guest OS, and the hypervisor's operating system, if any, is called the host OS. The hypervisor 123 exists outside of a guest OS to intercept the commands sent to the computer hardware.

In some embodiments, the execution of virtual compute instances 121 is supported by hypervisor 123 in the role of a lightweight virtual machine manager (VMM). These lightweight VMMs enable the launch of lightweight microVMs in non-virtualized environments in fractions of a second. These lightweight VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host machine 112. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

In some implementations, customers of a cloud provider can deploy containers by managing clusters of virtual compute instances 121 that run container agents. In such implementations, customers manage scaling, monitoring, patching, and security of the virtual compute instances 121, in addition to managing their containerized workload. In some implementations, customers of a cloud provider may deploy and scale containerized workloads automatically without having to manage the underlying computing resources, for example via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of virtual compute instances 121 on behalf of the customer.

In some implementations, at least a subset of virtualization management tasks may be performed at one or more offload cards 126 so as to enable more of the processing capacity of the host machine 112a to be dedicated to client-requested compute instances—e.g., cards connected via PCI or PCIe to the physical processors and other components of the host machine 112 may be used for some virtualization management components. Such an offload card 126 of the host machine 112 can include one or more CPUs that are not available to customer instances, but rather are dedicated to instance management tasks such as virtual machine management, input/output virtualization to network-attached storage volumes, local migration management tasks, instance health monitoring, and the like. For example, a host machine 112a could use the CPUs of the offload card 126 to execute the hypervisor 123 managing the virtual compute instances 121 on the host machine 112a.

Offload cards 126 can also be used to allow the cloud provider network 100 to provide a management interface to the control servers 103 for management and control of individual host machines 112. For example, an offload card 126 may provide a console interface to a host machine 112 that is available through the network 109 by a separate network interface installed on the offload card 126. This could allow for the cloud provider network 100 to perform management functions on a host machine 112 independently from the customer(s) to whom the host machine 112 is allocated or assigned. For example, the offload card 126 could provide a mechanism for a control server 103 to force a reboot or power cycle of the host machine 112 in the event that a customer has accidentally lost the ability to remotely login or control the host machine 112. As another example, the offload card 126 could allow a control server 103 to wipe or restore a host machine 112 to a default state when a customer has ceased using the host machine 112 (e.g., because the customer has decided that he or she no longer needs the resources provided by the host machine 112).

Accordingly, the control server 103 can execute one or more services that interact with the previously described components of the cloud provider network 100, such as a test service 129. The test service 129 can be executed to introduce hardware-based faults into the operation of individual host machines 112 or groups of host machines 112. Examples of such hardware-based faults can include the loss of network connectivity for a host machine 112, an unexpected power interruption (e.g., the sudden loss of power to a host machine 112, an unexpected power-cycle of the host machine 112, etc.), the corruption of individual pages of random access memory (RAM) of the host machine 112, etc.

These hardware-based faults can represent or otherwise simulate actual faults in the hardware of a host machine 112. For example, disconnecting a network interface of a host machine 112, or blocking traffic to the host machine 112 at the network switch 118, would be equivalent to a network hardware failure. As another example, sending a command to a host 112 to perform a power cycle or hard reset would be equivalent to the host machine 112 losing power and then having power restored. Similarly, writing random data to one or more pages of RAM of the host machine 112 would be equivalent to RAM or memory corruption (e.g., due to a faulty RAM module, a cosmic ray flipping one or more bits in RAM, etc.).

Next, a general description of the operation of the various components of the cloud provider network 100 is provided. Although the following description provides an illustrative example of the operation of the cloud provider network 100 according to various embodiments of the present disclosure, other operations are also encompassed by the present disclosure. Additional detail regarding the operation of specific portions of the cloud provider network 100 are set forth in FIG. 2 and FIG. 3.

To begin, the test service 129 could receive an instruction to initiate a test of the cloud provider network 100 by introducing simulated hardware faults. As discussed in the present disclosure, a simulated hardware fault occurs when the test service 129, directly or indirectly, causes the hardware of a host machine 112 to operate in a manner that is representative of or consistent with the behavior that would be expected in the event of a hardware failure or error. For example, deactivating or blocking all network traffic to a network interface would simulate the effects or impact of a failure of the network interface. As another example, overwriting a page of memory of the host machine 112 would simulate the effects or impact of a faulty memory module introducing errors in memory. Similarly, deactivating or making a block storage device or a disc drive unavailable to the operating system or applications of a host machine 112 would simulate the effects or impact of a drive failure. Likewise, causing the host machine 112 to power cycle, also sometimes referred to as a hard reset, can simulate the effects or impact of an unexpected loss of power to the host machine 112.

In response, the test service 129 can collect information about the host machine 112 to be tested. For example, the test service 129 could send a query to the hypervisor 123 executing on the host machine 112 to determine whether any virtual compute instances 121 are hosted by the host machine 112. If the host machine 112 is hosting one or more virtual compute instances 121, the hypervisor 123 could reply with the network addresses of each of the hosted virtual compute instances 121.

The test service 129 can then initiate the test by simulating a hardware fault or failure. For example, the test service 129 could communicate with a network switch 118 to block all network traffic to the host machine 112, except for network traffic between the control server(s) 103 executing the test service 129 and the host machine 112. As another example, the test service 129 could connect to an offload card 126 that provides a separate network connection and low-level management functionality for the host machine 112. The test service 129 could communicate with the offload card 126 to cause the host machine 112 to disconnect a network interface from the network 109, to disconnect or dismount block storage devices or disk drives, to overwrite pages in memory to simulate memory errors, to cause the host machine 112 to power cycle, etc.

After introducing the simulated hardware fault, the test service 129 could attempt to connect to the hypervisor 123 or the virtual compute instances 121 across the network 109. The test service 129 could attempt to reach the hypervisor 123 or individual ones of the virtual compute instances 121 using internet control message protocol (ICMP) packets (e.g., ping) or application layer tools like a secure shell (SSH) client or cURL. If the test service 129 can reach the hypervisor 123 or the individual ones of the virtual compute instances 121, then the test service 129 can conclude that the hypervisor 123 and/or virtual compute instances 121 successfully recovered from the simulated hardware failure. However, if the test service 129 is unable to reach the hypervisor 123 or the individual ones of the virtual compute instances 121, or only reach the hypervisor 123 or the individual ones of the virtual compute instances 121 with a subset of the available tools, the test service 129 can conclude that the hypervisor 123 and/or one or more of the virtual compute instances 121 failed to successfully or completely recover from the simulated hardware fault.

The test service 129 can also log or record the results of the simulated hardware faults. For example, the test service 129 can record the type of simulated hardware fault that was introduced, and whether the hypervisor 123 or virtual compute instances 121 completely, partially, and/or successfully recovered. These results could be written to a log server, or stored as a log file on a file server or in a an object based storage system.

Figure 2:
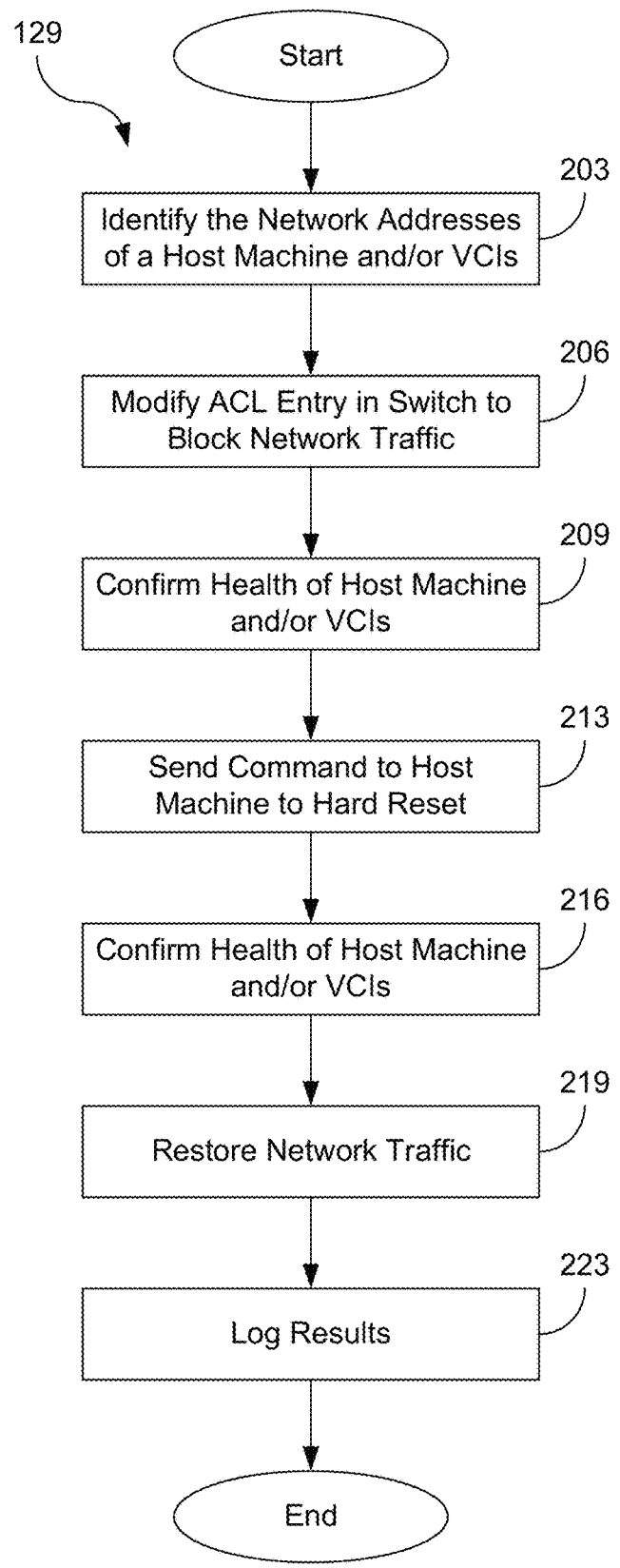
FIG. 2 is a flowchart illustrating one example of functionality implemented as portions of an application executed in the network environment of FIG. 1 according to various embodiments of the present disclosure.

Referring next to FIG. 2, shown is a flowchart that provides one example of the operation of a portion of the test service 129. The flowchart of FIG. 2 provides merely an example of the many different types of functional arrangements that can be employed to implement the operation of the depicted portion of the test service 129. As an alternative, the flowchart of FIG. 2 can be viewed as depicting an example of elements of a method implemented within the cloud provider network 100.

Beginning with block 203, the test service 129 can identify the network addresses (e.g., internet protocol (IP) addresses) of one or more virtual compute instances 121 executed by a host machine 112. This could be done, for example, in response to the test service 129 receiving a test scenario or other instructions from a user identifying one or more host machines 112 to test. For example, the test service 129 could send a request to the hypervisor 123 for the network addresses of any virtual compute instances 121 hosted by the host machine 112.

Then, at block 206, the test service 129 could then block network traffic to a first network interface card (NIC) of the host machine 112 and any virtual compute instances 121 hosted by the host machine 112. For example, the test service 129 could send a command to a switch 118 to disable one or more ports to which the first NIC of the host machine 112 is connected, thereby blocking network traffic to the hypervisor 123 and/or the virtual compute instances 121. As another example, the test service 129 could send a command to the switch 118 to block traffic from all network addresses to the network addresses of the hypervisor 123 and the virtual compute instances 121, except for those network addresses in a list of allowed network addresses. For example, the test service 129 could modify an access control list (ACL) maintained by the switch 118 to allow network traffic from the control server(s) 103 hosting the test service 129, but to block network traffic from all other network addresses. This would effectively simulate a network-related hardware failure, such as a failed network interface card (NIC) of the host machine 112, a failed network cable or connection, a failed switch 118, etc.

Commands could be sent to the switch 118 using a variety of approaches. For example, the test service 129 could send a simple network management protocol (SNMP) message to the switch 118 to adjust its configuration. As another example, the test service 129 could execute an automated script that would remotely login to the switch 118 (e.g., using a secure shell (SSH) tunnel) and execute one or more commands to modify the ACL of the switch 118.

Proceeding to block 209, the test service 129 can confirm the health of the host machine 112 and/or any virtual compute instances executing on the host machine 112. For example, the test service 129 could use internet control message protocol (ICMP) messages (e.g., ping) to determine whether the hypervisor 123 or the virtual compute instances 121 are still active. As another example, the test service 129 could use tools like netcat, cURL, etc. to initiate telecommunications protocol (TCP) or universal datagram protocol (UDP) with open ports for services hosted by the hypervisor 123 or virtual compute instances 121 (e.g., by connecting to an SSH server hosted by the hypervisor 123 or virtual compute instances 121). Because network traffic between control server(s) 103 and the host machine 112 was not blocked at block 206, the test service 129 is able to communicate with the host machine 112 and the virtual compute instances 121 hosted by the host machine 112 to determine whether they are still operating after the simulated failure of the connection with the network 109. Similarly, the test service 129 could use tools like cURL or wget to retrieve a status report from a monitoring service 125 executed by the host machine 112 or by a virtual compute instance 121.

Next, at block 213, the test service 129 can send a command to the host machine 112 to perform a power cycle, also referred to as a hard reset. For example, the test service 129 could send a command to a second network interface provided by the offload card 126 of the host machine 112. The command could instruct the management console, firmware or operating system executed by the offload card 126 to initiate the power cycle or hard reset. In response, the Moving on to block 216, the test service 129 can confirm the health of the host machine 112 and/or any virtual compute instances executing on the host machine 112. For example, the test service 129 could use internet control message protocol (ICMP) messages (e.g., ping) to determine whether the hypervisor 123 or the virtual compute instances 121 are still active. As another example, the test service 129 could use tools like netcat, cURL, etc. to initiate telecommunications protocol (TCP) or universal datagram protocol (UDP) with open ports for services hosted by the hypervisor 123 or virtual compute instances 121 (e.g., by connecting to an SSH server hosted by the hypervisor 123 or virtual compute instances 121). If the test service 129 can initiate a TCP or UDP session, then the test service 129 can determine that the host machine 112 and/or the virtual compute instances 121 are healthy and operating normally. Similarly, the test service 129 could use tools like cURL or wget to retrieve a status report from a monitoring service 125 executed by the host machine 112 or by a virtual compute instance 121.

Because network traffic between control server(s) 103 and the host machine 112 was not blocked at block 206, the test service 129 is able to communicate with the host machine 112 and the virtual compute instances 121 hosted by the host machine 112 to determine whether they were able to resume operation after the power cycle of the host machine 112. For example, if the test service 129 fails to receive any ICMP replies from the host machine 112 or the virtual compute instances 121, the test service 129 could conclude that either the host machine 112 or the virtual compute instances 121 failed to restart or reboot after power was restored. As another example, if the test service 129 receives ICMP responses, but is unable to make a TCP or a UDP connection with an SSH client, netcat, cURL, or a similar utility, then the test service 129 could determine that either the host machine 112 or the virtual compute instances 121 were unable to successfully complete a reboot after power was restored, as evidenced by the failure of the network stack of the host machine 112 or the virtual compute instances 121 to fully recover.

In some implementations, the test service 129 could further confirm that any hosted virtual compute instances 121 not only successfully restarted, but that they were restored to their execution state as it existed prior to the power cycle or hard reset that occurred at block 213. For example, snapshots of a hosted virtual compute instance 121 may be taken at periodic intervals, and the test service 129 could send a request to the hypervisor 123 to determine whether a hosted virtual compute instance 121 restarted from its most recent snapshot.

Referring to block 219, the test service 129 can restore network traffic to the host machine 112 and/or virtual compute instances 121. For example, the test service 129 could send a command to the switch 118 to remove the block of the ports as previously instructed at block 206. Alternatively, the test service 129 could send a command to the switch 118 to remove the entries in the ACL that were added at block 206.

Subsequently, at block 223, the test service 129 can log the results of blocks 203 through 219, and in particular blocks 209 and 216. For example, the test service 129 could write to a log server or external object or file storage service the results of the test performed at blocks 203-219, including whether the host machine 112 or the virtual compute instances 121 were able to successfully reboot in response to a power cycle or if either the host machine 112 or the virtual compute instances 121 experienced operational problems as the result of the simulated failure of the connection with the network 109.

Figure 3:
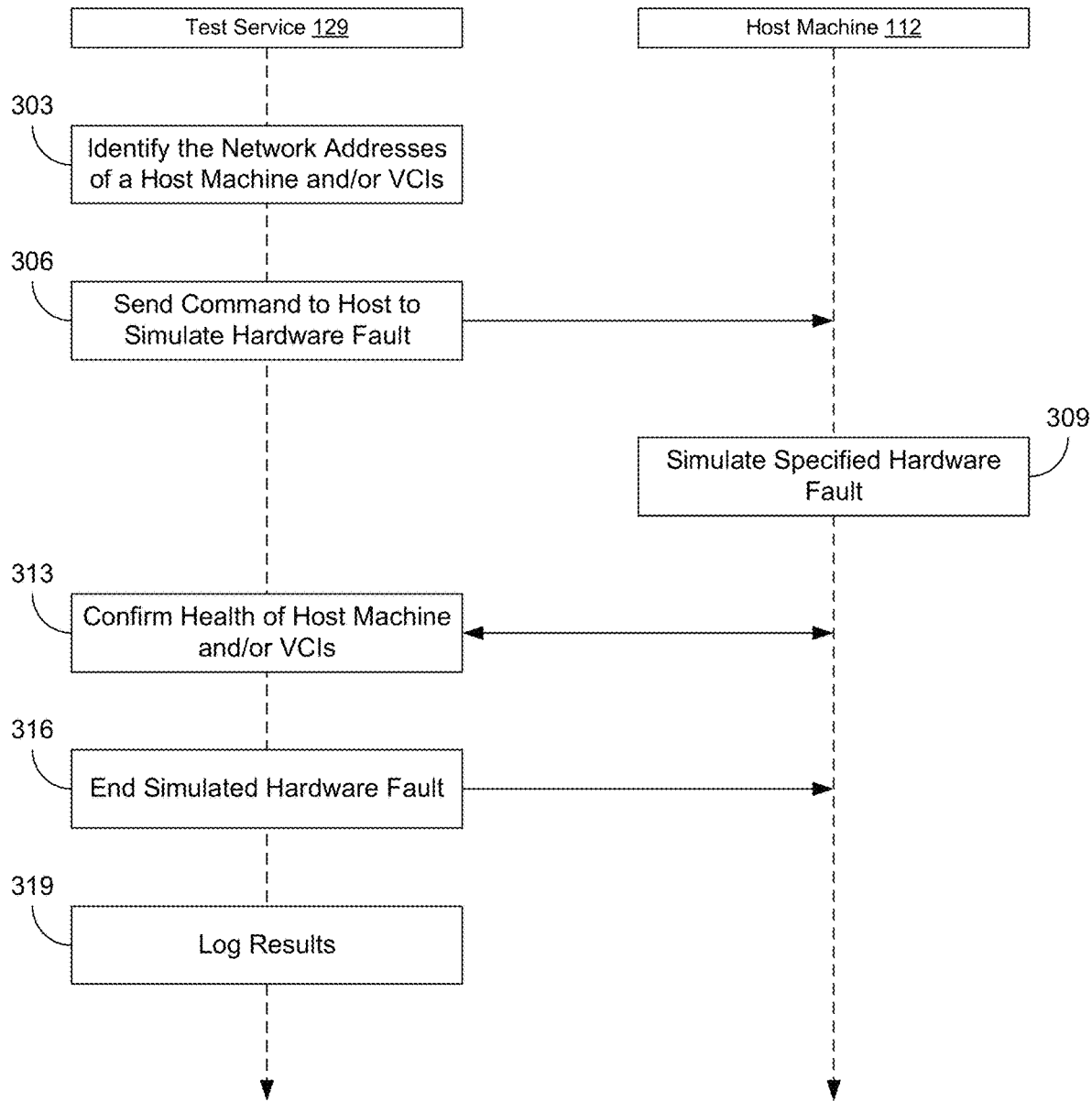
FIG. 3 is a sequence diagram illustrating one example of interactions between the various components of the network environment of FIG. 1 according to various embodiments of the present disclosure.

Referring next to FIG. 3, shown is a sequence diagram that provides one example of the interaction between the test service 129 and a host machine 112. The sequence diagram of FIG. 3 provides merely an example of the many different types of functional arrangements that can be employed to implement the operations of the depicted portions of the test service 129 and host machine 112. As an alternative, the flowchart of FIG. 3 can be viewed as depicting an example of elements of a method implemented within the cloud provider network 100.

Beginning with block 303, the test service 129 can identify the network addresses (e.g., internet protocol (IP) addresses) of one or more virtual compute instances 121 executed by a host machine 112. This could be done, for example, in response to the test service 129 receiving a test scenario or other instructions from a user identifying one or more host machines 112 to test. For example, the test service 129 could send a request to the hypervisor 123 for the network addresses of any virtual compute instances 121 hosted by the host machine 112.

Then, at block 306, the test service 129 can send a command to the host machine 112 to simulate a hardware fault. For example, the test service 129 could initiate a network connection with the offload card installed on the host machine 112 in order to interact with a management console interface provided by the offload card 126. The type of hardware fault could include various hardware faults that could be simulated, such as a network interface failure, memory corruption, a disk failure, a power failure or power interruption, etc.

Subsequently, at block 309, the host machine 112 simulates the hardware fault specified by the test service 129 at block 306. For example, if the offload card 126 received an instruction to simulate a network failure, the offload card 126 could take down one or more network interfaces or network interface cards (NICs). In this situation, because the test service 129 is interacting with the network interface provided by the offload card 126, the test service 129 would still be in data communication with the host machine 112 in order to send further commands or instructions. As another example, if the offload card 126 received an instruction to simulate memory corruption (e.g., as a result of faulty memory or bit flips cause by cosmic rays), then the offload card 126 could replace one or more pages stored in the memory of the host machine 112 with random data or could modify the contents of one or more pages (e.g., by reading a page, modifying one or more bits, and the saving the modified page to memory). Similarly, if the offload card 126 received an instruction to simulate the failure of a block storage device or disk drive (e.g., a hard disk drive, solid state drive, tape drive, optical disk drive, or partition thereof), the offload card 126 could dismount the block storage device or disk drive so that it is no longer available to the hypervisor 123 or virtual compute instances 121 executing on the host machine 112. As another example, if the offload card 126 received an instruction to simulate a power failure or power interruption, the offload card 126 could cause the host machine 112 to power cycle, also referred to as a hard reset.

Next, at block 313, the test service 129 can confirm the health of the host machine 112 and/or any virtual compute instances 121 hosted by the host machine 112. For example, the test service 129 could use internet control message protocol (ICMP) messages (e.g., ping) to determine whether the hypervisor 123 or the virtual compute instances 121 are still active after the simulated hardware fault was introduced. As another example, the test service 129 could use tools like netcat, cURL, etc. to initiate a telecommunications protocol (TCP) or universal datagram protocol (UDP) session with open ports for services hosted by the hypervisor 123 or virtual compute instances 121 (e.g., by connecting to an SSH server hosted by the hypervisor 123 or virtual compute instances 121). Similarly, the test service 129 could use tools like cURL or wget to retrieve a status report from a monitoring agent hosted by the host machine 112. If the test service 129 can initiate a TCP or UDP session, then the test service 129 can determine that the host machine 112 and/or the virtual compute instances 121 are healthy and operating normally.

For instance, if the test service 129 fails to receive any ICMP replies from the host machine 112 or the virtual compute instances 121, the test service 129 could conclude that either the host machine 112 or the virtual compute instances 121 failed to successfully recover from the simulated hardware fault. As another example, if the test service 129 receives ICMP responses, but is unable to make a TCP or a UDP connection with an SSH client, netcat, cURL, or a similar utility, then the test service 129 could determine that either the host machine 112 or the virtual compute instances 121 were only able to partially recover from the simulated hardware fault, as evidenced by the failure of the network stack of the host machine 112 or the virtual compute instances 121 to fully recover.

Proceeding to block 316, the test service 129 can then send a message to the host machine 112 to end the simulated hardware fault. For example, the test service 129 could send a message to the network interface provided by the offload card 126. The offload card 126 could then follow the commands or instructions in the message to cause the host machine 112 to end the simulated hardware fault. This could include restoring the disconnected or dismounted block storage device or disc drive, restoring the network interface used by the hypervisor 123 and/or virtual compute instances 121, etc.

Then, at block 319, the test service 129 can log the results of blocks 303 through 316, and in particular block 313. For example, the test service 129 could write to a log server or external object or file storage service the results of the test performed at blocks 303-316, including whether the host machine 112 or the virtual compute instances 121 were able to successfully continue operation in spite of the simulated hardware fault or were able to reboot or recover in response to the simulated hardware fault. Likewise, the test service 129 could write to a log server or external object or file storage service if either the host machine 112 or the virtual compute instances 121 experienced operational problems as the result of the simulated hardware fault(s) introduced by the test service 129.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a first computing device comprising a processor and a memory; and
   machine-readable instructions stored in the memory that, when executed by the processor, cause the first computing device to at least:
      send a command to an offload card installed on a second computing device to cause the second computing device to power cycle, wherein the second computing device comprises a hypervisor that hosts at least one virtual compute instance;
      in response to the second computing device power cycling, send an Internet Control Message Protocol (ICMP) message to the second computing device to determine that the second computing device has begun booting after the power cycle;
      in response to a determination that the second computing device has begun booting, establish a first Transmission Control Protocol (TCP) session with the second computing device to determine that the second computing device has completed booting after the power cycle; and
      in response to a determination that the second computing device has completed booting, establish a second TCP session with the at least one virtual compute instance to determine that the at least one virtual compute instance has recovered from the power cycle of the second computing device.

2. The system of claim 1, wherein the machine-readable instructions, when executed by the processor, further cause the first computing device to at least:
   block network traffic to the hypervisor of the second computing device and the at least one virtual compute instance of the second computing device; and
   determine that the hypervisor of the second computing device and the at least one virtual compute instance of the second computing device have recovered from the blocked network traffic.

3. The system of claim 2, wherein the machine-readable instructions that cause the first computing device to block the network traffic, when executed by the processor, further cause the first computing device to at least modify an entry in an access control list (ACL) of a network switch to block the network traffic to the second computing device.

4. The system of claim 2, wherein the machine-readable instructions, when executed by the processor, further cause the first computing device to at least remove the block of the network traffic subsequent to a determination that the hypervisor of the second computing device and the at least one virtual compute instance of the second computing device have recovered from the block of the network traffic.

5. A method performed by a first computing device, comprising
   sending a command to an offload card installed on a second computing device to cause the second computing device to power cycle, wherein the second computing device comprises a hypervisor that hosts at least one virtual compute instance;
   in response to the second computing device power cycling, sending an Internet Control Message Protocol (ICMP) message to the second computing device to determine that the second computing device has begun booting after the power cycle;
   in response to a determination that the second computing device has begun booting, establishing a first Transmission Control Protocol (TCP) session with the second computing device to determine that the second computing device has completed booting after the power cycle; and
   in response to a determination that the second computing device has completed booting, establishing a second TCP session with the at least one virtual compute instance to determine that the at least one virtual compute instance has recovered from the power cycle of the second computing device.

6. The method of claim 5, further comprising:
   blocking network traffic to the hypervisor of the second computing device and the at least one virtual compute instance of the second computing device; and
   determining that the hypervisor of the second computing device and the at least one virtual compute instance of the second computing device have recovered from the blocked network traffic.

7. The method of claim 6, wherein blocking the network traffic further comprises modifying an entry in an access control list (ACL) of a network switch to block the network traffic to the second computing device.

8. The method of claim 6, further comprising removing the block of the network traffic subsequent to a determination that the hypervisor of the second computing device and the at least one virtual compute instance of the second computing device have recovered from the block of the network traffic.

9. A non-transitory, computer-readable medium comprising machine-readable instructions that, when executed by a processor of a first computing device, cause the first computing device to at least:
send a command to an offload card installed on a second computing device to cause the second computing device to power cycle, wherein the second computing device comprises a hypervisor that hosts at least one virtual compute instance;
in response to the second computing device power cycling, send an Internet Control Message Protocol (ICMP) message to the second computing device to determine that the second computing device has begun booting after the power cycle;
in response to a determination that the second computing device has begun booting, establish a first Transmission Control Protocol (TCP) session with the second computing device to determine that the second computing device has completed booting after the power cycle; and
in response to a determination that the second computing device has completed booting, establish a second TCP session with the at least one virtual compute instance to determine that the at least one virtual compute instance has recovered from the power cycle of the second computing device.

10. The non-transitory, computer-readable medium of claim 9, wherein the machine-readable instructions, when executed by the processor, further cause the first computing device to at least:
block network traffic to the hypervisor of the second computing device and the at least one virtual compute instance of the second computing device; and
determine that the hypervisor of the second computing device and the at least one virtual compute instance of the second computing device have recovered from the blocked network traffic.

11. The non-transitory, computer-readable medium of claim 10, wherein the machine-readable instructions that cause the first computing device to block the network traffic, when executed by the processor, further cause the first computing device to at least modify an entry in an access control list (ACL) of a network switch to block the network traffic to the second computing device.

12. The non-transitory, computer-readable medium of claim 10, wherein the machine-readable instructions, when executed by the processor, further cause the first computing device to at least remove the block of the network traffic subsequent to a determination that the hypervisor of the second computing device and the at least one virtual compute instance of the second computing device have recovered from the block of the network traffic.

* * * * *